(12) United States Patent
Kuo et al.

(10) Patent No.: US 9,676,114 B2
(45) Date of Patent: Jun. 13, 2017

(54) WAFER EDGE TRIM BLADE WITH SLOTS

(75) Inventors: Chun-Ting Kuo, Tainan (TW);
Kei-Wei Chen, Tainan (TW);
Ying-Lang Wang, Tien-Chung Village (TW); Kuo-Hsiu Wei, Tainan (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 419 days.

(21) Appl. No.: 13/408,327

(22) Filed: Feb. 29, 2012

(65) Prior Publication Data

US 2013/0220090 A1 Aug. 29, 2013

(51) Int. Cl.
| | | |
|---|---|---|
| *B26D 1/143* | (2006.01) | |
| *B28D 5/02* | (2006.01) | |
| *B24D 5/02* | (2006.01) | |
| *B24D 5/12* | (2006.01) | |
| *B23D 61/02* | (2006.01) | |
| *B28D 1/04* | (2006.01) | |
| *B26D 7/18* | (2006.01) | |
| *B28D 1/12* | (2006.01) | |

(52) U.S. Cl.
CPC ............. *B26D 7/18* (2013.01); *B23D 61/02* (2013.01); *B23D 61/021* (2013.01); *B24D 5/02* (2013.01); *B24D 5/12* (2013.01); *B28D 1/04* (2013.01); *B28D 1/121* (2013.01); *B28D 5/022* (2013.01); *B26D 1/143* (2013.01); *Y10T 83/0448* (2015.04); *Y10T 83/9372* (2015.04)

(58) Field of Classification Search
CPC ....... B26D 1/143; B26D 7/18; Y10T 83/9338; B28D 5/02; B28D 5/022; B28D 1/04; B28D 1/12; B28D 1/121; B24D 5/02; B24D 5/04; B24D 5/12
USPC .................... 451/541, 544, 546, 547; 125/15
See application file for complete search history.

(56) References Cited

U.S. PATENT DOCUMENTS

| | | | | |
|---|---|---|---|---|
| 3,127,887 | A * | 4/1964 | Metzger ........................ | 125/15 |
| 3,128,755 | A * | 4/1964 | Benson ......................... | 125/15 |
| 4,739,745 | A * | 4/1988 | Browning ...................... | 125/15 |
| 5,087,307 | A * | 2/1992 | Nomura et al. ............... | 156/154 |
| 5,295,331 | A * | 3/1994 | Honda et al. .................. | 451/44 |
| 5,392,759 | A * | 2/1995 | Kwang .......................... | 125/15 |
| 5,871,005 | A * | 2/1999 | Sueta ............................. | 125/15 |
| 6,045,436 | A * | 4/2000 | Rieger et al. .................. | 451/44 |
| 6,401,705 | B1 * | 6/2002 | Suzuki ........................... | 125/15 |
| 6,478,021 | B1 * | 11/2002 | Kim et al. ..................... | 125/15 |
| 6,638,152 | B1 * | 10/2003 | Kim et al. ..................... | 451/541 |
| D513,952 | S * | 1/2006 | Lee et al. ...................... | D8/70 |
| 7,004,157 | B2 * | 2/2006 | Sakita et al. .................. | 125/15 |
| 7,281,970 | B2 * | 10/2007 | Endres .................... | C03C 10/00 451/28 |
| 7,462,096 | B2 * | 12/2008 | Montabaur .................... | 451/547 |
| 7,946,907 | B2 * | 5/2011 | Heyen .......................... | 451/541 |
| 8,568,205 | B2 * | 10/2013 | Gosamo et al. .............. | 451/547 |
| 2002/0002971 | A1 * | 1/2002 | Spangenberg ................ | 125/15 |
| 2002/0115399 | A1 * | 8/2002 | Lee et al. ...................... | 451/547 |
| 2003/0148723 | A1 * | 8/2003 | Wildenburg .................. | 451/541 |
| 2005/0224063 | A1 * | 10/2005 | Sakita et al. .................. | 125/15 |

(Continued)

*Primary Examiner* — Eileen Morgan
(74) *Attorney, Agent, or Firm* — Hauptman Ham, LLP

(57) ABSTRACT

A wafer edge trim blade includes a round blade body and at least one slot formed inward from an outside edge of the round blade body. The at least one slot is configured to remove debris generated during wafer edge trimming using the wafer edge trim blade.

19 Claims, 5 Drawing Sheets

(56) References Cited

U.S. PATENT DOCUMENTS

2007/0023026 A1* 2/2007 Michelle ..................... 125/15
2008/0251061 A1* 10/2008 Baratta ....................... 125/15

* cited by examiner

WAFER EDGE TRIM BLADE WITH SLOTS

TECHNICAL FIELD

The present disclosure relates generally to a wafer edge trim blade for an integrated circuit wafer.

BACKGROUND

In some integrated circuit fabrications, a wafer is trimmed on the edge to reduce damage to the wafer during processing. However, during the edge trimming, the wafer can suffer from trim line sidewall damage that can be attacked by subsequent etching processes. The trim line sidewall damage results from surface particle debris generated during wafer edge trimming process. The debris between the trim blade and the wafer sidewall pose high risk for sidewall damage.

BRIEF DESCRIPTION OF THE DRAWINGS

Reference is now made to the following descriptions taken in conjunction with the accompanying drawings, in which.

DETAILED DESCRIPTION

Figure 1:
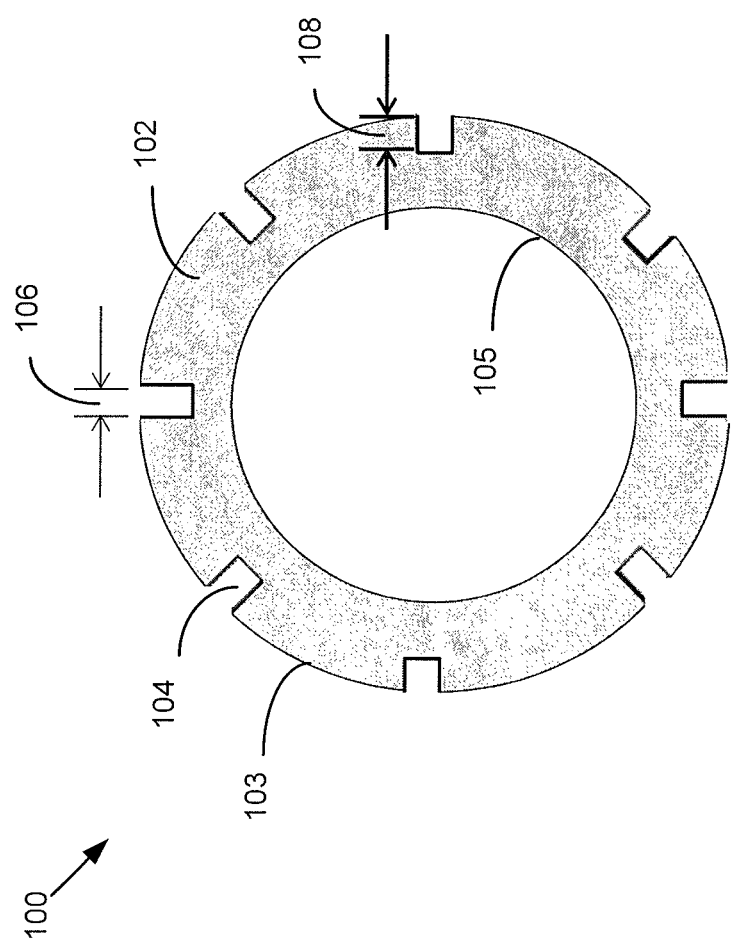
FIG. 1 is a schematic diagram of an exemplary wafer edge trim blade with slots according to some embodiments.

The making and using of various embodiments are discussed in detail below. It should be appreciated, however, that the present disclosure provides many applicable inventive concepts that can be embodied in a wide variety of specific contexts. The specific embodiments discussed are merely illustrative of specific ways to make and use, and do not limit the scope of the disclosure.

In addition, the present disclosure may repeat reference numerals and/or letters in the various examples. This repetition is for the purpose of simplicity and clarity and does not in itself dictate a relationship between the various embodiments and/or configurations discussed. In addition, spatially relative terms, for example, "lower," "upper," "horizontal," "vertical," "above," "below," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

FIG. 1 is a schematic diagram of an exemplary wafer edge trim blade 100 with slots 104 according to some embodiments. The wafer edge trim blade 100 includes a round blade body 102 and slots 104 formed inward from the outside edge of the blade body 102. The slots 104 can be distributed at equal distance around the outside edge 103 of the blade body 102 or at different distances between each other. The slots 104 are configured to remove debris generated during wafer edge trimming using the wafer edge trim blade 100. Each slot 104 has a slot width 106 and a slot depth 108. Each slot 104 can have the same or different slot width 106 and the same or different slot depth 108 compared to other slots 104.

Each slot 104 has a rectangular shape positioned perpendicular at about a 90° angle relative to the blade outside edge in FIG. 1, but the edge of the slots 104 can have other shapes such as triangular or have different angles relative to the blade outside edge. The slots 104 remove the debris from the wafer sidewall area generated during the wafer edge trimming and reduce the sidewall damage of the wafer from remaining debris. The number of slots 104 ranges from 1 to 32, the slot width 106 ranges from 0.5 mm to 3 mm, the slot depth 108 ranges from 1 mm to 3 mm, and the blade thickness of the wafer edge trim blade 100 ranges from 1.5 mm to 2.5 mm in some embodiments. The blade thickness is suited for wafer edge trimming in some applications.

The wafer edge trim blade 100 comprises bond materials and diamond grit in some embodiments. The bond material in the wafer edge trim blade 100 holds together the diamond grit, which is used to remove material out of the wafer. The wafer edge trim blade 100 can be bonded using different bond materials. For example, resin bond material (e.g., synthetic resin), metal bond material such as non-iron series metal (e.g., copper, tin, etc.), electroplated bond material (e.g., nickel), vitrified bond material, or any other suitable materials. The size of the diamond grit can vary from 2 μm to 16 μm based on different process requirement in some embodiments. The wafer edge trim blade 100 has an outer diameter of outside edge 103 ranging from 47 mm to 53 mm, an inner diameter of inside edge 105 ranging from 39 to 41 mm in some embodiments. The inside edge 105 is used for fixing the wafer edge trim blade to a wafer edge trimming machine (not shown).

The wafer edge trim blade 100 is used for wafer edge trimming to prevent damage or breakage to the wafer due to edge chipping during a process such as wafer thinning. By using the wafer edge trim blade 100, the sidewall damage during edge trimming can be reduced by removing debris from the sidewall area and minimize the defect source of the following process. The wafer edge trimming process using the wafer edge trim blade 100 can be used in many applications including backside illumination (BSI) sensor wafers.

Figure 2B:
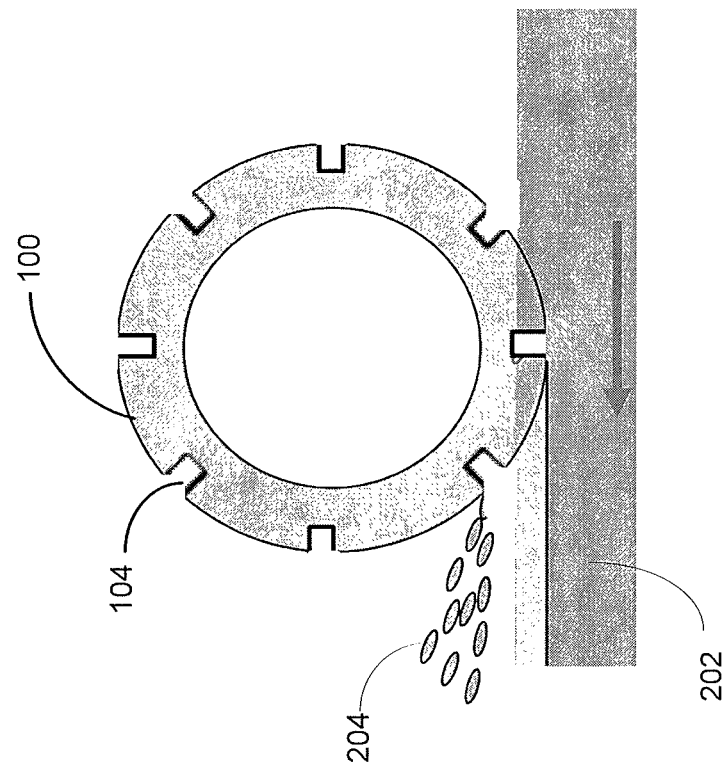
FIG. 2B is a cross section view of the wafer and the blade in FIG. 2A according to some embodiments.
Figure 2A:
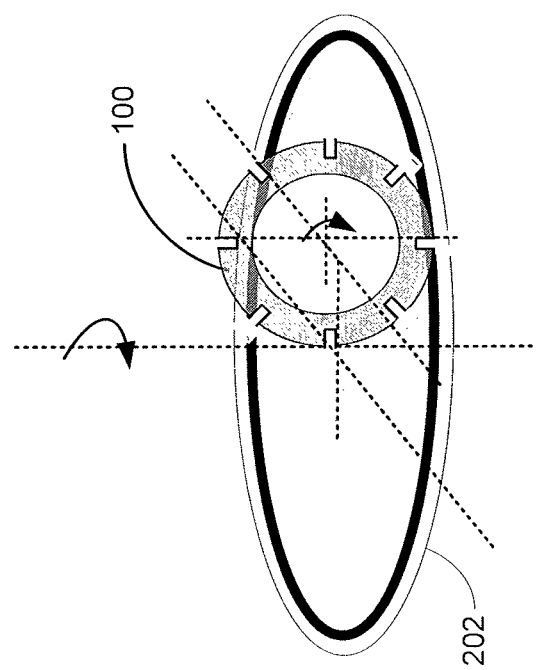
FIG. 2A is a perspective view of a wafer being processed using the wafer edge trim blade in FIG. 1 according to some embodiments.

FIG. 2A is a perspective view of a wafer being processed using the wafer edge trim blade 100 in FIG. 1 according to some embodiments. The wafer edge trim blade 100 is fixed to a wafer edge trimming machine (not shown) and a wafer 202 is loaded into a work area for wafer edge trimming. The wafer edge trim blade 100 is moved toward the wafer 202 (e.g. lowered) while rotating to contact the wafer 202 and start trimming. The wafer 202 is moved (e.g., rotated either clock wise or counterclockwise) for edge trimming as the rotating wafer edge trim blade 100 cuts the edge of the wafer 202.

FIG. 2B is a cross section view of the wafer and the blade in FIG. 2A according to some embodiments. As the rotating wafer edge trim blade 100 cuts the edge of the wafer 202 that moves to the blade 100 (e.g., by rotation as shown in FIG.

2A), the debris 204 are removed by the slots 104 to reduce the sidewall damage during edge trimming.

Figure 3B:
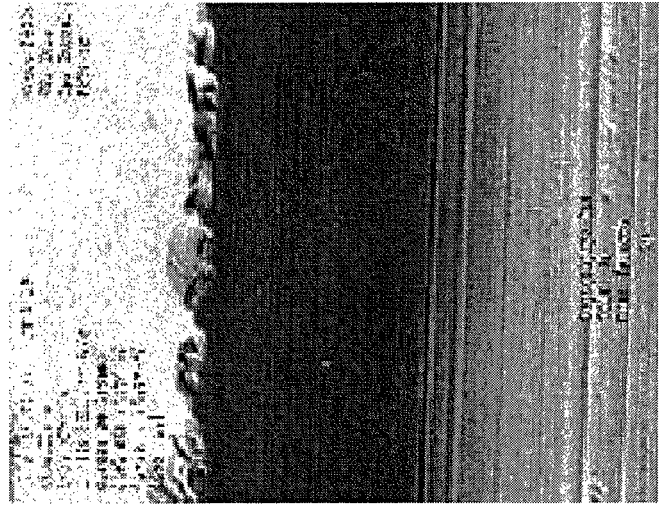
FIG. 3B is a photographic cross-sectional view of an exemplary wafer trimmed with the wafer edge trim blade with slots in FIG. 1.
Figure 3A:
FIG. 3A is a photographic cross-sectional view of an exemplary wafer trimmed with a wafer edge trim blade without slots.

FIG. 3A is a photographic cross-sectional view of an exemplary wafer trimmed with a wafer edge trim blade without slots. The photographic cross-sectional view shows significant sidewall damage with big cracks on top. In contrast, FIG. 3B is a photographic cross-sectional view of an exemplary wafer trimmed with the wafer edge trim blade 100 in FIG. 1 with slots 104. The cross section shows substantially reduced sidewall damages.

Figure 4:
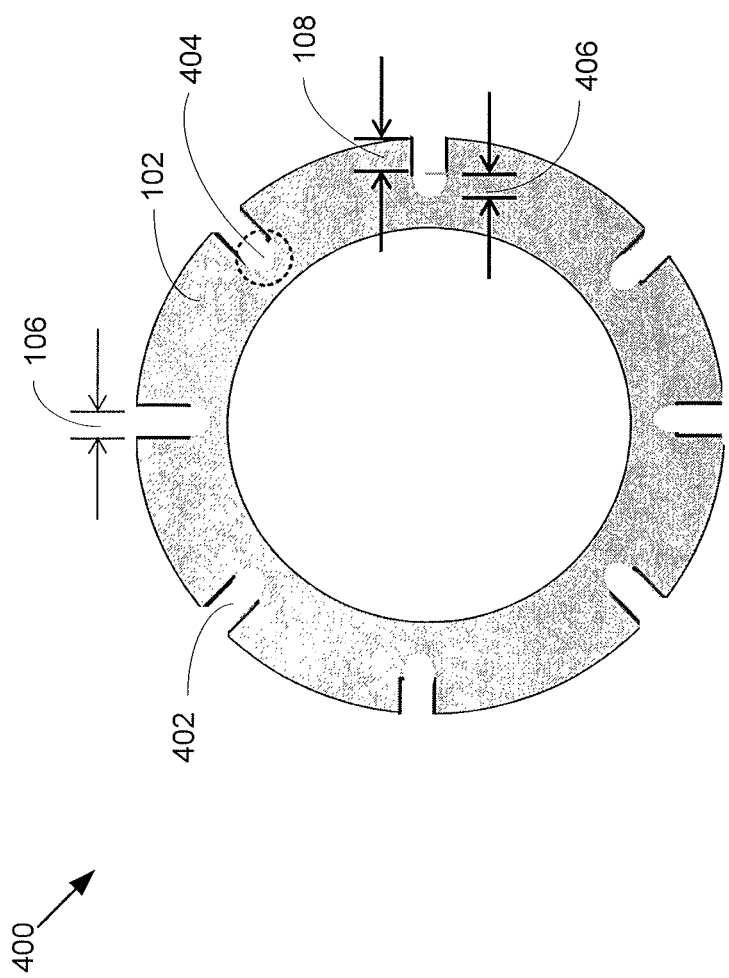
FIG. 4 is a schematic diagram of another exemplary wafer edge trim blade with slots according to some embodiments.

FIG. 4 is a schematic diagram of another exemplary wafer edge trim blade 400 with slots 402 according to some embodiments. The wafer edge trim blade 400 has slots 402 with rounded endings 404. The rounded ending length 406 ranges from 0.5 to 1.5 times of the slot width 106 in some embodiments. The rounded endings 404 help to remove debris from the slots 402. The number of slots 402 ranges from 4 to 32, the slot width 106 ranges from 0.5 mm to 3 mm, the slot depth 108 ranges from 1 mm to 3 mm, and the blade thickness ranges from 1.5 mm to 2.5 mm in some embodiments.

Figure 5:
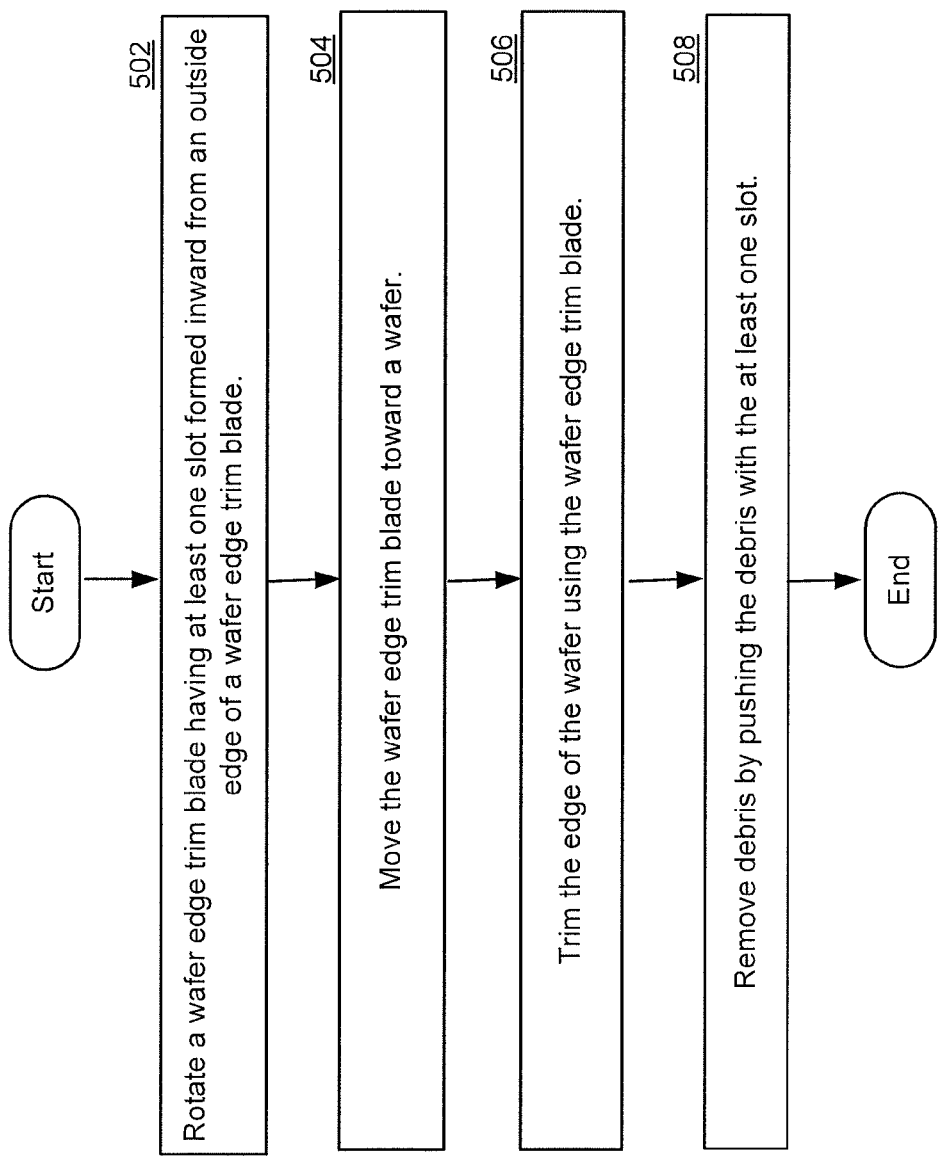
FIG. 5 is a flowchart of an exemplary wafer edge trimming method using the wafer edge trim blade in FIG. 1 or FIG. 4.

FIG. 5 is an exemplary wafer edge trimming method using the wafer edge trim blade in FIG. 1 and FIG. 4. At step 502, a wafer edge trim blade is rotated, with the wafer edge trim blade having at least one slot formed inward from an outside edge of the wafer edge trim blade. At step 504, the wafer edge trim blade is moved toward a wafer. At step 506, the edge of the wafer is trimmed with the wafer edge trim blade. At step 508, debris are removed by pushing the debris with the at least one slot.

For the wafer trimming process, the wafer edge trim blade is fixed to a wafer edge trimming machine and the wafer is loaded into a work area for wafer edge trimming.

According to some embodiments, a wafer edge trim blade includes a round blade body and at least one slot formed inward from an outside edge of the round blade body. The at least one slot is configured to remove debris generated during wafer edge trimming using the wafer edge trim blade.

According to some embodiments, a method of trimming an edge of a wafer includes rotating a wafer edge trim blade having at least one slot formed inward from an outside edge of the wafer edge trim blade. The wafer edge trim blade is moved toward a wafer. The edge of the wafer is trimmed using the wafer edge trim blade. Debris are removed by pushing the debris with the at least one slot A skilled person in the art will appreciate that there can be many embodiment variations of this disclosure. Although the embodiments and their features have been described in detail, it should be understood that various changes, substitutions and alterations can be made herein without departing from the spirit and scope of the embodiments. Moreover, the scope of the present application is not intended to be limited to the particular embodiments of the process, machine, manufacture, and composition of matter, means, methods and steps described in the specification. As one of ordinary skill in the art will readily appreciate from the disclosed embodiments, processes, machines, manufacture, compositions of matter, means, methods, or steps, presently existing or later to be developed, that perform substantially the same function or achieve substantially the same result as the corresponding embodiments described herein may be utilized according to the present disclosure.

The above method embodiment shows exemplary steps, but they are not necessarily required to be performed in the order shown. Steps may be added, replaced, changed order, and/or eliminated as appropriate, in accordance with the spirit and scope of embodiment of the disclosure. Embodiments that combine different claims and/or different embodiments are within the scope of the disclosure and will be apparent to those skilled in the art after reviewing this disclosure.

What is claimed is:

1. A wafer edge trim blade, comprising:
   a round blade body having an outer diameter and an inner diameter, wherein the inner diameter defines an opening, a thickness of the round blade body ranges from 1.5 millimeters (mm) to 2.5 mm, the outer diameter of the round blade body ranges from 47 mm to 53 mm, the inner diameter of the round blade body ranges from 39 mm to 41 mm, an entirety of the round blade body between the outer diameter and the inner diameter comprises diamond grit and has a substantially uniform thickness; and
   a plurality of slots extending inward from an outermost surface of the round blade body, wherein each slot of the plurality of slots is provided in the round blade body at different distances from one another.

2. The wafer edge trim blade of claim 1, wherein a number of the plurality of slots ranges from 4 to 32.

3. The wafer edge trim blade of claim 1, wherein each slot of the plurality of slots has a slot width ranging from 0.5 mm to 3 mm.

4. The wafer edge trim blade of claim 1, wherein each slot of the plurality of slots has a slot depth ranging from 1 mm to 3 mm.

5. The wafer edge trim blade of claim 1, wherein a first largest width of a rounded portion a first slot of the plurality of slots is smaller than or equal to a second largest width of one first slot that is farthest away from a center of the round blade body.

6. The wafer edge trim blade of claim 1, wherein an inward portion of a first slot of the plurality of slots is rounded.

7. The wafer edge trim blade of claim 6, wherein the rounded inward portion has a length ranging from 0.5 times to 1.5 times of a slot width of the first slot.

8. The wafer edge trim blade of claim 1, an entirety of the round blade body between the outer diameter and the inner diameter comprises diamond grit.

9. The wafer edge trim blade of claim 8, wherein the diamond grit have a size ranging from 2 μm to 16 μm.

10. A method of trimming an edge of a wafer comprising:
    rotating a wafer edge trim blade having at least one slot formed inward from an outside edge of the wafer edge trim blade, wherein the wafer edge trim blade comprises:
      a thickness of the wafer edge trim blade ranges from 1.5 millimeters (mm) to 2.5 mm,
      an outer diameter of the wafer edge trim blade ranges from 47 mm to 53 mm,
      an inner diameter of the wafer edge trim blade ranges from 39 mm to 41 mm, wherein the inner diameter defines an opening, and
      the at least one slot has a constant slot width, and an entirety of a body of the wafer edge trim blade between the outer diameter and the inner diameter comprises diamond grit, and a thickness of the body is substantially uniform;
    moving the wafer edge trim blade toward a wafer;
    trimming the edge of the wafer using the wafer edge trim blade; and
    removing debris by pushing the debris with the at least one slot.

11. The method of claim 10, further comprising fixing the wafer edge trim blade to a wafer edge trimming machine.

12. The method of claim 10, further comprising loading the wafer into a work area for wafer edge trimming.

13. A wafer edge trim blade, comprising:
   a round blade body, wherein the round blade body has a substantially uniform thickness, and the round blade body comprising:
      an outer diameter, wherein the outer diameter of the round blade body ranges from 47 millimeters (mm) to 53 mm;
      an inner diameter, wherein the inner diameter of the round blade body defines an opening, the inner diameter of the round blade body ranges from 39 mm to 41 mm; and
      the substantially uniform thickness of the round blade body ranges from 1.5 mm to 2.5 mm;
   a diamond grit containing portion extending across an entirety of the round blade body from the outer diameter to the inner diameter; and
   multiple slots inward from the outer diameter of the round blade body and distributed at equal distances around the outer diameter, wherein at least one slot of the multiple slots has parallel sidewalls.

14. The wafer edge trim blade of claim 13, wherein the diamond grit have a size ranging from 2 μm to 16 μm.

15. The wafer edge trim blade of claim 13, wherein each of the multiple slots have an inward portion that is rounded.

16. The wafer edge trim blade of claim 15, wherein the rounded inward portion has a length ranging from 0.5 times to 1.5 times of a slot width of the at least one slot.

17. The wafer edge trim blade of claim 13, wherein a number of slots of the multiple slots ranges from 4 to 32.

18. The wafer edge trim blade of claim 13, wherein the at least one slot of the multiple slots has a slot width ranging from 0.5 mm to 3 mm.

19. The wafer edge trim blade of claim 13, wherein the at least one slot of the multiple slots has a slot depth ranging from 1 mm to 3 mm.

* * * * *